Dec. 30, 1924.
A. SNIEGOCKI
1,521,054
TAILOR'S MEASURING DEVICE
Filed May 1, 1922
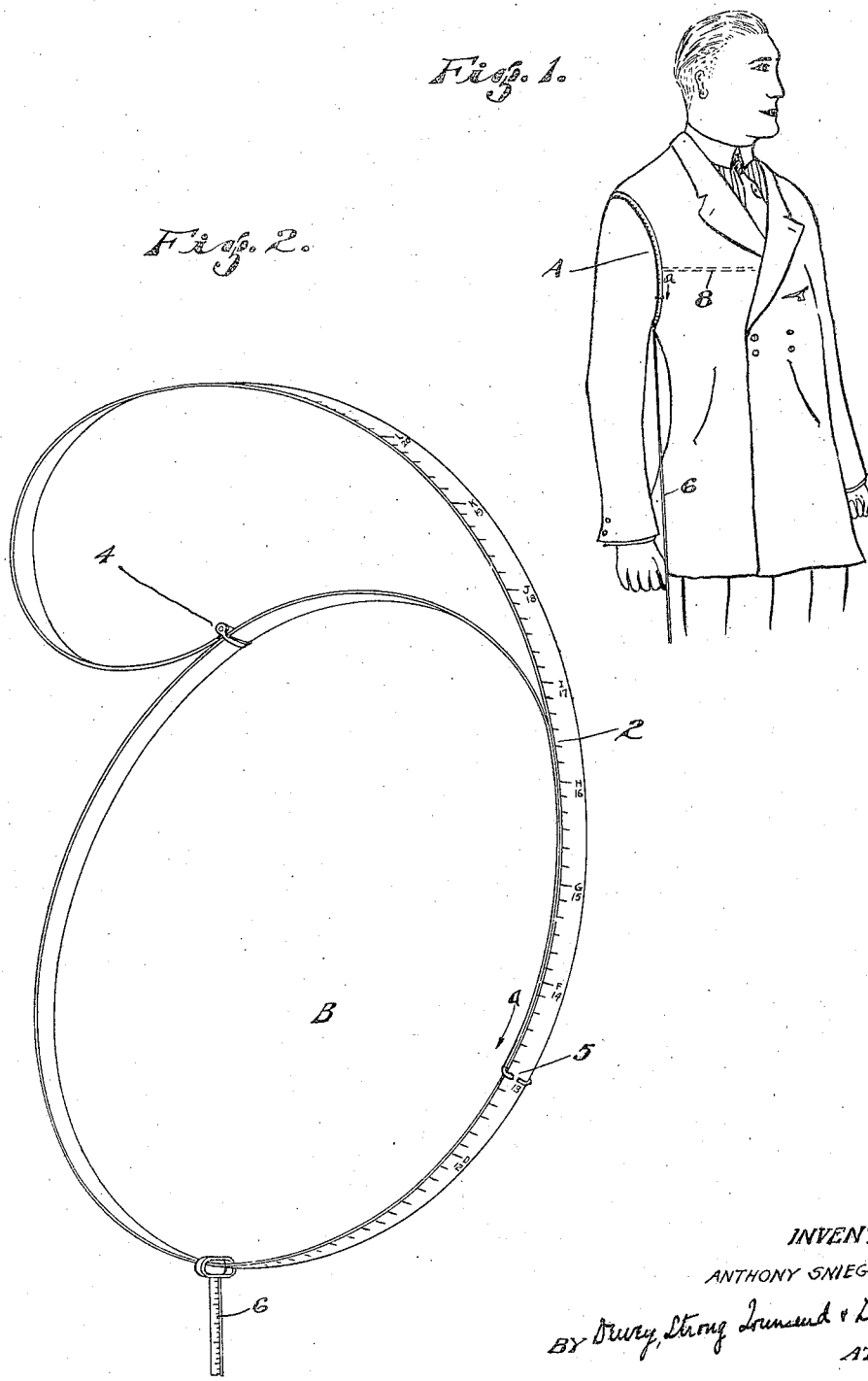
INVENTOR
ANTHONY SNIEGOCKI
BY Drury, Strong Townsend & Loftus
ATTYS.

Patented Dec. 30, 1924.

1,521,054

UNITED STATES PATENT OFFICE.

ANTHONY SNIEGOCKI, OF OAKLAND, CALIFORNIA.

TAILOR'S MEASURING DEVICE.

Application filed May 1, 1922. Serial No. 557,588.

*To all whom it may concern:*

Be it known that I, ANTHONY SNIEGOCKI, a citizen of Poland, residing at Oakland, county of Alameda, and State of California, have invented new and useful Improvements in Tailors' Measuring Devices, of which the following is a specification.

This invention relates to tailors' measures for coats, vests and the like, and more particularly to an armhole and sleeve measuring device.

The object of the present invention is to generally improve and simplify devices of the character described, and especially to provide a device which can be readily and quickly positioned, and whereby accurate and adjustable measurements may be obtained. Further objects will hereinafter appear.

One form which my invention may assume is exemplified in the following description and illustrated in the accompanying drawings, in which—

Fig. 1 is a perspective view showing the device in position when an armhole or sleeve measurement is being taken.

Fig. 2 is a perspective view of the measuring device.

Referring to the drawings in detail, A indicates a flexible steel tape, one side of which is graduated to form a measuring scale as indicated at 2. The steel tape is bent to form a loop, as shown in Fig. 2, and one end of the tape overlies the other. A sliding and pivotal connection is formed between the overlying end and the tape proper, as indicated at 4, and a sliding connection is formed between the opposite end and the tape as shown at 5. Attached to the steel tape, and particularly the loop portion B, see Fig. 2, is a measuring tape 6, which may be constructed of any suitable material; this tape being employed for the purpose of measuring sleeve lengths and for taking other measurements, as will hereinafter be described.

In actual practice if the armhole of a coat is to be measured, as shown in Fig. 1, it is only necessary to slip the tape over the arm and to vertically position the same over the shoulder as shown. The sliding connection is then pulled until a desired pressure or tension is assumed and the measurement may then be read directly from the tape 2. To decrease the size of the loop, the sliding connection is pulled in the direction of arrow *a*, see Fig. 1, and to increase the size of the loop, movement in the opposite direction is imparted. Armhole or sleeve measurements of any size can in this manner be taken care of and accurate and dependable measurements are secured as it is a simple matter to vertically align the measuring device when in position on the wearer. If it is desired to simultaneously secure the measurement of a sleeve length, it is accomplished by employing the measuring tape 6. This is extended down the length of the arm as shown in Fig. 1, and measurement can thus be readily taken. If it is desired to take the chest measurement, or to obtain the distance from the armhole to the opening in the coat, the tape 6 is moved to the horizontal position indicated by dotted lines at 8, and when the measurement of the back seam of the coat is to be taken, the tape 6 is shifted on the loop to a point substantially opposite to the position it has when taking a first measurement.

By referring to Fig. 2, it will be seen that the scale is also marked with letters, as indicated at A, B, C, D, E, F, etc. These letters refer to standard patterns which may be employed in connection with the device, and the tailor when taking a measurement can thus use his choice in either taking down the measurement indicated by the scale, or by merely marking down the reference letter on the pattern. For instance D indicates one size of sleeve pattern, E another, and so on.

The measuring device is exceedingly simple to apply and adjust, and as it is a simple matter to vertically adjust the same when in position, it can readily be seen that quick and accurate measurements can be taken.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or various uses may demand.

Having thus described my invention, what I claim and desire to secure by Letters Patent is—

1. A tailor's measuring device comprising a flexible resilient tape having a measuring indicia thereon, said tape being bent to form an arm encircling loop and having its ends overlapping, a yoke fixed on the tape, a hinged connection between the yoke and the outer overlapping end of the tape, and a sliding connection formed between the tape and the inner overlapping end, said connections co-operating to permit a quick and easy adjustment of the tape.

2. A tailor's measuring device comprising a flexible resilient tape having a measuring indicia thereon, said tape being bent to form an arm encircling loop and having its ends overlapping, said overlapping end portions being adapted to form a second loop, a yoke fixed on the tape intermediate the ends of the latter, a hinged connection between the yoke and the overlapping end of the tape, a sliding connection between the tape and the inner overlapping end thereof, said connections cooperating to permit a quick and easy adjustment of the tape, and a second measuring tape slidably attached to the arm encircling loop and normally depending therefrom for taking a sleeve or similar measurement, and movable to positions substantially at right angles to its normal position for taking chest and back measurements.

ANTHONY SNIEGOCKI